June 11, 1957  G. W. CHAMPNEY  2,795,285
ELECTRICAL CONTROL APPARATUS FOR VARIABLE PITCH PROPELLERS
Filed July 29, 1953  2 Sheets-Sheet 1
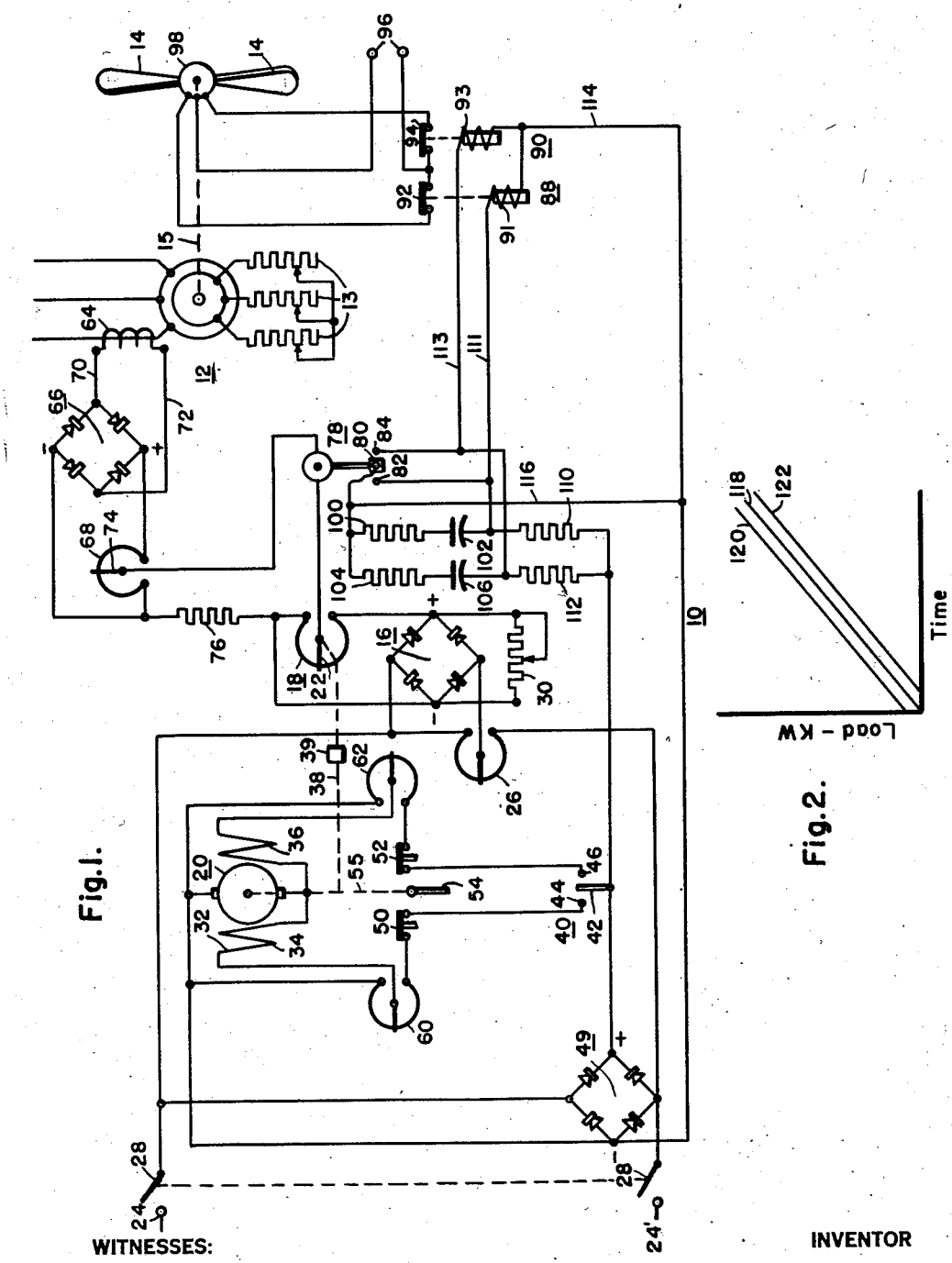

WITNESSES:

INVENTOR
Guy W. Champney.
BY
Ezra D. Savage
ATTORNEY

United States Patent Office 2,795,285
Patented June 11, 1957

2,795,285
ELECTRICAL CONTROL APPARATUS FOR VARIABLE PITCH PROPELLERS
Guy W. Champney, Pitcairn, Pa., assignor to Westinghouse Electric Corporation, East Pittsburgh, Pa., a corporation of Pennsylvania
Application July 29, 1953, Serial No. 371,034
16 Claims. (Cl. 170—160.17)

This invention relates to a rate of change controller for controlling, for instance, the rate of change of load, speed, or voltage.

In addition to regulating the load on a drive motor, it is oftentimes necessary to increase or decrease the load on the drive motor at a predetermined rate. For instance, many power companies require that the load on such a drive motor be only brought up at so many kilowatts per second so as not to disturb the remainder of the distribution system. If the customer's drive motor does not load up sufficiently fast, then it is desirable for the customer to provide control apparatus for increasing the rate of loading up to the limits permitted by the power company. On the other hand, if the customer's drive motor picks up the load too rapidly, the customer should provide control apparatus for decreasing the rate of loading. This control apparatus should also be capable of decreasing the loading on the drive motor at a predetermined rate in order to meet the power company's requirements. It is also oftentimes necessary to increase and decrease the output voltage of a generator or the speed of a motor at a predetermined rate.

An object of this invention is to provide for increasing or decreasing a given electrical or mechanical quantity at a predetermined constant rate, by comparing a variable signal proportional to the electrical or mechanical quantity with a reference signal that increases at a predetermined constant rate so as to obtain an error signal for controlling the magnitude of the electrical or mechanical quantity to thereby increase or decrease it at a predetermined constant rate.

Another object of this invention is to provide a novel combination for increasing or decreasing a given electrical or mechanical quantity at a predetermined constant rate and for regulating the quantity once it reaches a predetermined value.

A more specific object of this invention is to provide for increasing or decreasing the load on a drive motor at a predetermined constant rate, by comparing a variable signal proportional to the load on the drive motor with a reference signal that increases at a predetermined constant rate so as to obtain an error signal for controlling the magnitude of the load on the drive motor to thereby increase or decrease it at a predetermined constant rate.

Other objects of this invention will become apparent from the following description when taken in conjunction with the accompanying drawings, in which:

Figure 1 is a schematic diagram of apparatus and circuits illustrating an embodiment of this invention in which control apparatus is provided for increasing or decreasing the load on a drive motor at a predetermined constant rate and for regulating the load once it reaches a predetermined value;

Fig. 2 is a graph illustrating the manner in which the load on the drive motor illustrated in Fig. 1 varies with time;

Figure 3:
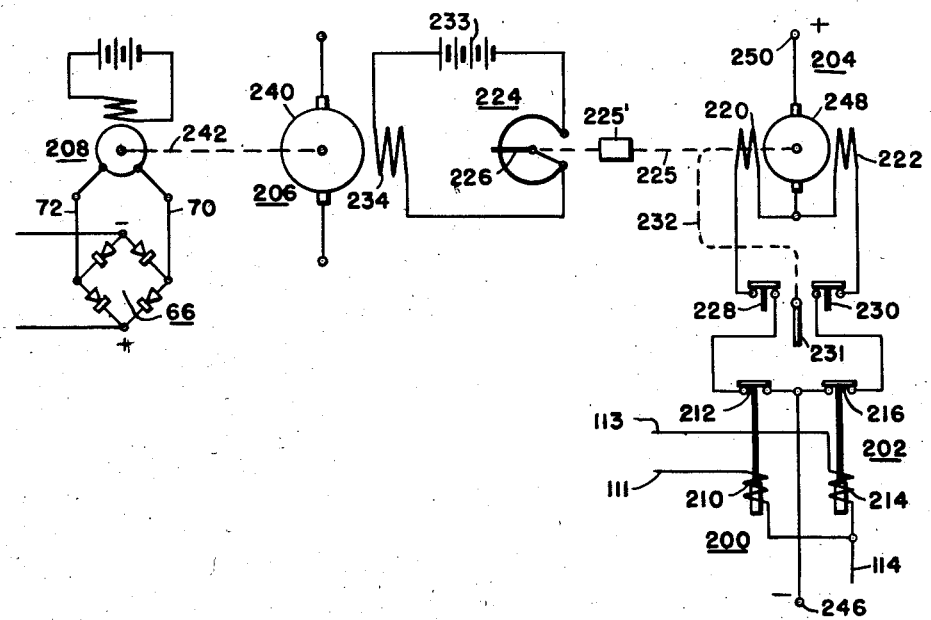
Figure 4:
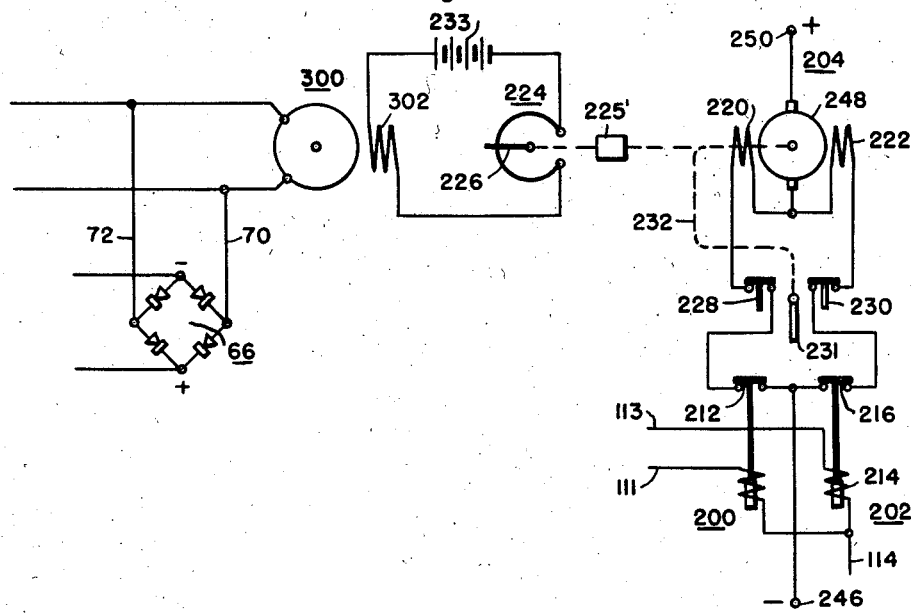

Fig. 3 is a schematic diagram of apparatus and circuits illustrating another embodiment of this invention in which control apparatus is provided for increasing or decreasing the speed of a motor at a predetermined constant rate and for regulating the speed of the motor once the speed reaches a predetermined value; and Fig. 4 is a schematic diagram of circuits and apparatus illustrating still another embodiment of this invention in which control apparatus is provided for increasing or decreasing the output voltage of a generator at a predetermined constant rate and for regulating the output voltage once it reaches a predetermined value.

Referring to Fig. 1, there is illustrated an embodiment of this invention in which control apparatus 10 is provided for increasing or decreasing the load on a wound rotor induction drive motor 12 at a predetermined constant rate and for regulating the load on the motor 12 once the load reaches a predetermined value. As illustrated, the motor 12 is provided with external rotor resistors 13 in order to obtain a proper torque curve for the motor 12. In general, the control apparatus 10 comprises means for producing a reference signal, and more particularly a reference voltage, that varies at a predetermined constant rate, means electrically connected to the drive motor 12 for producing a variable signal, and more particularly a variable direct-current voltage, proportional to the load on the drive motor 12, circuit means interconnected with the first two means for producing an error signal proportional to the difference between the reference signal and the variable signal which is proportional to the load on the motor 12, and relaying means responsive to the error signal for controlling the pitch of a propeller 14 which is mechanically connected to the motor 12 by means of a mechanical connection 15.

The means for producting a reference signal and more particularly a reference voltage that varies at a predetermined constant rate comprises a full-wave dry-type rectifier 16 across whose input is applied a substantially constant alternating-current voltage, a rheostat 18 whose input is electrically connected to the output of the rectifier 16, and a direct-current reversible motor 20 for rotating the rotatable contact member 22 of the rheostat 18 at a constant rate. The substantially constant alternating-current voltage applied to the input of the rectifier 16 is obtained from the terminals 24 and 24' which have applied thereto a substantially constant alternating-current voltage. In particular, the output of a rheostat 26 is connected to the input of the rectifier 16, one of the input terminals of the rheostat 26 being connected to the terminal 24' through a main switch 28. On the other hand, the other input terminal of the rheostat 26 is connected to the terminal 24 through the main switch 28. Thus, the input voltage to the rectifier 16 can be varied by adjusting the rheostat 26 and the substantially constant direct-current output voltage of the rectifier 16 can be varied by adjusting a variable resistor 30 which is connected to the output of the rectifier 16.

In this instance, the motor 20 comprises an armature 32 and field windings 34 and 36. In order to rotate the contact member 22 of the rheostat 18 at a constant rate, the armature 32 of the motor 20 is mechanically connected to the contact member 22 by means of a mechanical connection 38 which includes a gear train 39. The direction of rotation of the motor 20 and thus the direction of rotation of the contact member 22 of the rheostat 18 is controlled by means of a manual switch 40 having a movable contact member 42 and associated stationary contacts 44 and 46.

As will be explained more fully hereinafter, when the movable contact member 42 of the switch 40 is actuated into engagement with its associated stationary contact 44, an energizing circuit is completed to the field winding 34 of the motor 20 to thereby effect a rotation of the contact member 22 of the rheostat 18 in a counterclockwise direction and thus increase the reference voltage, appearing at the output of the rheostat 18; at a substantially constant rate. On the other hand, as also will be explained more fully hereinafter, when the movable contact member 42 of the switch 40 is actuated into engagement with its associated stationary contact 46, an energizing circuit is completed to the field winding 36 of the motor 20 to thereby effect a rotation of the contact member 22 of the rheostat 18 in a clockwise direction and thus decrease the reference voltage, appearing at the output of the rheostat 18, at a substantially constant rate. In this instance, the direct-current energy for the field windings 34 and 36 of the motor 20 is obtained from a full-wave dry-type rectifier 49 whose input is electrically connected to the terminals 24 and 24' through the main switch 28.

By providing limit switches 50 and 52, the movement of the rotatable contact member 22 of the rheostat 18 is limited. In particular, the limit switch 50 prevents the contact member 22 of the rheostat 18 from rotating in a counterclockwise direction beyond its position of maximum output voltage from the rheostat 18. On the other hand, the limit switch 52 prevents the contact member 22 of the rheostat 18 from rotating in a clockwise direction beyond its position of minimum output voltage from the rheostat 18. In this instance, the limit switches 50 and 52 are actuated into the open position by means of an actuating member 54 which is mechanically connected to the armature 32 of the motor 20 by means of a mechanical connection 55. Thus, after the contact member 22 of the rheostat 18 rotates a predetermined distance in the counterclockwise direction so as to obtain the maximum output voltage from the rheostat 18, the member 54 actuates the limit switch 50 to the open position. Also, when the contact member 22 of the rheostat 18 has been actuated in a clockwise direction to its position of minimum output voltage for the rheostat 18, the member 54 actuates the limit switch 52 to the open position. In order to control the speed of rotation of the contact member 22 of the rheostat 18 in a counterclockwise direction, and thus control the rate at which the output voltage from the rheostat 18 increases, a rheostat 60 is provided. On the other hand, in order to control the speed of rotation of the contact member 22 in a clockwise direction, and thus control the rate at which the output voltage from the rheostat 18 decreases, a rheostat 62 is provided.

The means electrically connected to the drive motor 12 for producing a variable signal, and more particularly, a variable direct-current voltage, proportional to the load on the drive motor 12 includes a current transformer 64, a full-wave dry-type rectifier 66 and a rheostat 68. As illustrated, the current transformer 64 is responsive to the load current of the drive motor 12 and is electrically connected to the input of the rectifier 66 by means of the conductors 70 and 72. The output of the rectifier 66 is electrically connected to the input of the rheostat 68 whose output can be varied by adjusting the movable contact member 74.

In order to produce an error signal that is proportional to the difference in the output voltages of the rheostats 18 and 68, a current limiting resistor 76 is connected to one side of the output of each of the rheostats 18 and 68. Relaying means including a polarized relay 78 having a movable contact member 80 and stationary contacts 82 and 84 is responsive to the error signal produced by the difference in the reference voltage, which appears at the output of the rheostat 18, and the variable direct-current voltage that appears at the output of the rheostat 68. In particular, the polarized relay 78 is connected to the rotatable contact member 22 of the rheostat 18 and to the movable contact member 74 of the rheostat 68.

In order to vary the pitch of the propeller 14 and thus the load on the drive motor 12, control relays 88 and 90 are provided. In this instance, the relay 88 comprises an operating coil 91 and a movable contact member 92 and its associated stationary contacts and the relay 90 comprises an operating coil 93 and a movable contact member 94 and its associated stationary contacts.

As will be explained more fully hereinafter, when the movable contact member 80 of the polarized relay 78 is actuated into engagement with its associated stationary contact 82, the movable contact member 92 of the relay 88 is actuated into the closed position with respect to its stationary contacts to thereby complete a direct-current energizing circuit from a direct-current source 96 to a prop-pitch motor 98 to thus decrease the pitch of the propeller 14 which, in turn, decreases the load on the drive motor 12. On the other hand, as will also be explained more fully hereinafter, when the movable contact 80 of the polarized relay 78 is actuated into engagement with its associated stationary contact 84, the movable contact member 94 of the relay 90 is actuated into the closed position with respect to its associated stationary contacts to thus complete a direct-current energizing circuit to the prop-pitch motor 98 to thus increase the pitch of the propeller 14 which, in turn, increases the load on the drive motor 12.

For the purpose of preventing arcing between the movable contact member 80 of the polarized relay 78 and its associated stationary contact 82, due to the decay in flux in the relay 88, a series circuit including a resistor 100 and a capacitor 102 is connected between the movable contact member 80 and the stationary contact 82. However, in order to prevent arcing between the movable contact member 80 and its associated stationary contact 84, due to the decay of flux in the relay 90, a series circuit including a resistor 104 and a capacitor 106 is electrically connected between the movable contact member 80 of the polarized relay 78 and its associated stationary contact 84.

Before a rotation of the contact member 22 of the rheostat 18 can be effected, the main switch 28 must be actuated to the closed position, thereby establishing energizing circuits for the operating coils 91 and 93 of the relays 88 and 90, respectively, and thus effecting an actuation of the movable contact members 92 and 94 of the relays 88 and 90, respectively, to the open position with respect to their associated stationary contacts. The energizing circuit for the operating coil 91 of the relay 88 extends from one of the output terminals of the rectifier 49 through a current limiting resistor 110, a conductor 111, the operating coil 91 of the relay 88, and a conductor 114 to the other output terminal of the rectifier 49. On the other hand, the energizing circuit for the operating coil 93 of the relay 90 extends from one of the output terminals of the rectifier 49 through a current limiting resistor 112, a conductor 113, the operating coil 93 of the relay 90, and the conductor 114, to the other output terminal of the rectifier 49.

Also, before putting the apparatus illustrated in Fig. 1 into operation, it is necessary to adjust the rheostat 68 to a given position in order to obtain a proper error signal for the polarized relay 78 when the control apparatus 10 is in operation. Further, before putting the apparatus illustrated in Fig. 1 into operation, it is necessary to adjust the variable resistor 30 and the rheostat 26 in order to obtain the proper input voltage to the rheostat 18. The rheostats 60 and 62 must also be adjusted in order to obtain the desired rate of increase and decrease, respectively, of the load on the drive motor 12.

Assuming it is desired to increase the load on the drive motor 12 at a predetermined constant rate starting from zero load, the movable contact member 42 of the switch 40 is actuated into engagement with its associated stationary contact 44. With the movable contact member 42 in engagement with the stationary contact 44, an energizing circuit is completed to the field winding 34 of the motor 20 which extends from one of the output terminals of the rectifier 49 through the movable contact member 42 of the switch 40, the stationary contact 44, the limit switch 50, the rheostat 60, the field winding 34 of the motor 20, and the armature 32, to the other output terminal of the rectifier 49.

Once this energizing circuit has been completed, the motor 20 effects a rotation of the contact member 22 of the rheostat 18 in a counterclockwise direction, starting from a position of zero output voltage from the rheostat 18. The rotatable contact member 22 continues to rotate until the actuating member 54 actuates the limit switch 50 to the open position, thereby interrupting the energizing circuit to the field winding 34 of the motor 20.

While the contact member 22 of the rheostat 18 is rotating in a counterclockwise direction, thereby increasing the reference voltage, appearing at the ouput of the rheostat 18, at a predetermined constant rate, a direct-current voltage, proportional to the load on the drive motor 12, is produced at the output of the rheostat 68. Assuming at a given instance the output voltage of the rheostat 68 is less than the output voltage of the rheostat 18, then the error signal, that is, the difference between the reference voltage at the ouput of the rheostat 18 and the variable voltage at the output of the rheostat 68, effects an actuation of the movable contact member 80 of the polarized relay 78 into engagement with its associated stationary contact 84. When this occurs, a by-pass circuit is established which by-passes the operating coil 93 of the relay 90 to thereby effect an actuation of the contact member 94 of the relay 90 to its closed position. This by-pass circuit extends from one side of the rectifier 49 through the current limiting resistor 112, the stationary contact 84 of the polarized relay 78, the movable contact member 80 of the polarized relay 78, and a conductor 116 to the other output terminal of the rectifier 49. In practice, the resistance value of the current-limiting resistor 112 is such that it properly limits the current when the by-pass circuit is established and yet when the movable contact member 80 of the polarized relay 78 is in the neutral position, as shown, it permits sufficient flow of current through the operating coil 93 of the relay 90 to actuate the movable contact member 94 to the open position with respect to its associated stationary contacts.

With the movable contact member 80 of the polarized relay 78 in engagement with the stationary contact 84 and with the movable contact member 94 of the relay 90 in the closed position with respect to its associated stationary contacts, an energizing circuit is established for the prop-pitch motor 98 to thereby increase the pitch of the propeller 14 and thus increase the load on the drive motor 12 until the output voltage of the rheostat 68 is substantially equal to the output voltage of the rheostat 18, thus effecting a return of the movable contact member 80 of the polarized relay 78 to its neutral position as shown in the drawings. This energizing circuit for the prop-pitch motor 98 extends from one of the terminals of the direct-current source 96 through the contact member 94 of the relay 90, and the prop-pitch motor 98 to the other terminal of the direct-current source 96.

On the other hand, if during the rotation of the contact member 22 of the rheostat 28 in a counterclockwise direction, the output voltage of the rheostat 68 increases, at any given instant, to a value above the output voltage of the rheostat 18, the error signal is such as to effect an actuation of the movable contact member 80 of the polarized relay 78 into engagement with its associated stationary contact 82. With the movable contact member 80 of the polarized relay 78 in engagement with its associated stationary contact 82, a by-pass circuit is established, by-passing the operating coil 91 of the relay 88, thereby effecting an actuation of the movable contact member 92 of the relay 88 into its closed position with respect to its associated stationary contacts. This by-pass circuit extends from one of the output terminals of the rectifier 49 through the current limiting resistor 110, the stationary contact 82 of the polarized relay 78, the movable contact member 80, and the conductor 116 to the other output terminal of the rectifier 49. In practice, the resistance value of the current limiting resistor 110 is such as to properly limit the current when this latter by-pass circuit is established and yet permit sufficient flow of current through the operating coil 91 of the relay 88 to actuate the movable contact member 92 to the open position when the movable contact member 80 of the polarized relay 78 is in the neutral position, as shown in the drawings.

With the movable contact member 80 of the polarized relay in engagement with its associated stationary contact 82 and with the movable contact member 92 of the relay 88 in the closed position with respect to its associated stationary contacts, an energizing circuit is established to the prop-pitch motor 98 to thereby decrease the pitch of the propeller 14 and thus decrease the load on the drive motor 12, until the output voltage of the rheostat 68 is substantially equal to the output voltage of the rheostat 18. This energizing circuit for the prop-pitch motor 98 extends from one of the terminals of the direct-current source 96 through the contact member 92 of the relay 88 and the prop-pitch motor 98 to the other terminal of the direct-current source 96.

Once the desired load on the drive motor 12 is reached, the movable contact member 42 of the switch 40 is actuated to its neutral position, as shown in Fig. 1. With the main switch 28 in the closed position and with the movable contact member 42 of the swtich 40 in the neutral position and with a given load on the drive motor 12, the control apparatus 10 operates as a regulator to maintain the given load on the drive motor 12. Thus, if the output voltage at the rheostat 68 deviates from the output voltage of the rheostat 18, the control relays 88 and 90, as hereinbefore explained, bring about a change in the pitch of the propeller 14 to thus maintain a substantially constant load on the drive motor 12.

In order to decrease the load on the drive motor 12 at a predetermined constant rate, the movable contact member 42 of the switch 40 is actuated into engagement with its associated stationary contact 46 to thereby complete an energizing circuit to the field winding 36 of the motor 20. This energizing circuit extends from one of the output terminals of the rectifier 49 through the movable contact member 42 of the switch 40, the stationary contact 46, the limit switch 52, the rheostat 62, the field winding 36 of the motor 20, and the armature 32 of the motor 20, to the other output terminal of the rectifier 49. On completion of the energizing circuit to the field winding 36 of the motor 20, the motor 20 effects a rotation of the contact member 22 of the rheostat 18 in a clockwise direction. If at any time during the clockwise rotation of the contact member 22 the output voltage of the rheostat 68 is greater in magnitude than the output voltage of the rheostat 18, the movable contact member 80 of the polarized relay 78 is actuated into engagement with its associated contact 82 to thereby effect an actuation of the contact member 92 of the relay 88 to the closed position with respect to its associated stationary contact to thus decrease the pitch of the propeller 14 and thus decrease the load on the drive motor 12.

On the other hand, if at any time during the clockwise rotation of the contact member 22 of the rheostat 18, the output voltage of the rheostat 68 is less than the output voltage of the rheostat 18, the movable contact 80 of the polarized relay 78 is actuated into engagement with its associated stationary contact 84 to thereby effect an actuation of the movable contact member 94 of the relay 90 to the closed position with respect to its associated stationary contacts. With the movable contact member 94 in the closed position, an energizing circuit is established to the prop-pitch motor 98 to thereby increase the pitch of the propeller 14 and thus increase the load on the drive motor 12 until the output voltage of the rheostat 68 increases to where it is substantially equal to the output voltage of the rheostat 18.

Referring to Fig. 2, there is illustrated a graph which represents the manner in which the load in kilowatts on the drive motor 12 varies with time. For instance, by setting the rheostats 60 and 62 in predetermined positions, the load on the drive motor 12 increases and decreases as represented by a curve 118. In practice, however, the load on the drive motor 12 increases and decreases at a predetermined constant rate deviating therefrom only by an amount determined by certain limits, as illustrated by the curves 120 and 122. Thus, if the load on the drive motor 12 at any given instant is outside of the area between the curves 120 and 122, the control apparatus 10 illustrated in Fig. 1 initiates a correcting action to thereby return the load on the drive motor 12 to some value within the area established between the curves 120 and 122. Of course, it is to be understood that the rheostats 60 and 62 can be so adjusted that the load on the drive motor 12 increases at a different rate than it decreases.

Referring to Fig. 3, there is illustrated another embodiment of the teachings of this invention in which like components of Figs. 1 and 3 have been given the same reference characters. In order to simplify the drawings only that portion which is different from the apparatus illustrated in Fig. 1 is illustrated in Fig. 3. The main distinction between the apparatus illustrated in Figs. 1 and 3 is that in the apparatus illustrated in Fig. 3 control relays 200 and 202, a direct-current reversible motor 204, a direct-current motor 206, and a tachometer 208 have been substituted for the corresponding control relays 88 and 90, the propeller 14, the prop-pitch motor 98, the drive motor 12, and the current transformer 64 illustrated in Fig. 1.

In the embodiment illustrated in Fig. 3, the control apparatus is disposed to either increase or decrease the speed of the motor 206 at a predetermined constant rate and regulate this speed once it reaches a predetermined value. As illustrated, the relay 200 comprises an operating coil 210 and a movable contact member 212 which is disposed to make contact with its associated stationary contacts. In this instance, the relay 202 comprises an operating coil 214 and a movable contact member 216 which is disposed to make contact with its associated stationary contacts.

In order to control the direction of rotation of the motor 204, the relay 200 and 202 are disposed to complete energizing the circuits to the field windings 220 and 222 of the motor 204. The direction of rotation of the motor 204, which is mechanically connected to a rheostat 224 by a mechanical connection 225 which includes a gear train 225'; determines the direction of rotation of the rotatable contact member 226 of the rheostat 224. By providing a limit switch 228, the rotatable contact member 226 of the rheostat 224 is prevented from being rotated beyond an extreme position in the counterclockwise direction. On the other hand, by providing a limit switch 230, the contact member 226 is prevented from being rotated beyond an extreme position in the clockwise direction. In particular, an actuating member 231 is mechanically connected to the motor 204 by means of a mechanical connection 232 in order to interrupt the energizing circuit to the field winding 220 of the motor 204 once the contact member 226 of the rheostat 224 has been rotated to its extreme position in a counterclockwise direction and in order to interrupt the energizing circuit to the field winding 222 of the motor 204 once the contact member 226 of the rheostat 224 has been rotated in a clockwise direction to its other extreme position.

As illustrated, a battery 233, having a substantially constant output voltage, is connected in circuit relationship with the rheostat 224 and with the field winding 234 of the motor 206.

In order to obtain a measure of the speed of the motor 206, the tachometer 208 is mechanically connected to the armature 240 of the motor 206 by means of a mechanical connection 242. In this instance, the output of the tachometer 208 is connected to the conductors 70 and 72 in order to apply to the input of the rectifier 66 a voltage proportional to the speed of the motor 206. In contrast, in the apparatus illustrated in Fig. 1, a voltage proportional to the load on the drive motor 12 was applied to the rectifier 66.

The operation of the embodiment illustrated in Fig. 3 is similar to the operation of the apparatus illustrated in Fig. 1, except that the relays 200 and 202 control the speed of the motor 206 instead of controlling the load on the drive motor 12, as did the control relays 88 and 90 illustrated in Fig. 1. Thus, assuming the speed of the motor 206 at a given instant is such as to produce an output voltage from the rheostat 68 that is greater than the output voltage of the rheostat 18 at the given instant then the movable contact member 212 of the relay 200 is actuated to the closed position with respect to its associated stationary contacts in response to the operation of the polarized relay 78. Such an action completes an energizing circuit to the field winding 220 of the motor 204 which extends from a negative terminal 246 of a source of direct current through the movable contact member 212 of the relay 200, the limit switch 228, the field winding 220 of the motor 204, and the armature 248 of the motor 204, to the positive terminal 250 of the source of direct current.

On completion of the energizing circuit to the field winding 220 of the motor 204, the armature 248 effects a rotation of the contact member 226 of the rheostat 224 in a counterclockwise direction to thereby decrease the speed of the motor 206. With the decrease in the speed of the motor 206, the input voltage across the input terminals of the rectifier 66 decreases to thereby decrease the output voltage of the rheostat 68 and thus return the output voltage of the rheostat 68 to a value substantially equal to the output voltage of the rheostat 18 at a given instant.

On the other hand, assuming the speed of the motor 206 at a given instant is such as to produce an output voltage from the rheostat 68 that is less than the output voltage of the rheostat 18 at the given instant, then the movable contact member 216 of the relay 202 is actuated into the closed position with respect to its associated stationary contacts, to thereby establish an energizing circuit for the field winding 222 of the motor 204. This energizing circuit extends from the negative terminal 246 through the movable contact member 216, the limit switch 230, the field winding 222 of the motor 204, and the armature 248, to the positive terminal 250. On completion of the energizing circuit to the field winding 222 of the motor 204, the motor 204 effects a rotation of the contact member 226 of the rheostat 224 in a clockwise direction to thereby increase the speed of the motor 206 as well as the output voltage of the tachometer 208, as applied to the input of the rectifier 66. With an increase in the voltage input to the rectifier 66, the output voltage of the rheostat 68 is increased until it reaches a value substantially equal to the output voltage of the rheostat 18. Thus, the embodiment illustrated in Fig. 3 is capable of increasing or decreasing the speed of the motor 206 at a predetermined constant rate and is capable of regulating the speed of the motor 206 when it reaches a predetermined value, as controlled by the manual operation of the switch 40 as hereinbefore mentioned with reference to the apparatus illustrated in Fig. 1.

Referring to Fig. 4, there is illustrated another embodiment of the teachings of this invention in which like components of Figs. 1, 3 and 4 have been given the same reference characters. The main distinction between the embodiments illustrated in Figs. 3 and 4 is that in the embodiment illustrated in Fig. 4, control apparatus is provided for increasing or decreasing the output voltage of a generator 300, having a field winding 302, at a predetermined constant rate and for regulating the output voltage of the generator 300 at a preselected value, as determined by the operation of the switch 40. In particular, the reversible motor 204 by effecting a rotation of the contact member 226 of the rheostat 224 varies the voltage across the field winding 302 of the generator 300 and thus the input voltage to the rectifier 66. Since the remainder of the operation of the embodiment illustrated in Fig. 4 is similar to the operation of the embodiment illustrated in Fig. 3, a further description of such operation is deemed unnecessary.

It is to be understood that relaying means other than the polarized relay 78 could be utilized. For instance, a magnetic polarized sensing device such as a push-pull magnetic amplifier (not shown) could be substituted for the polarized relay 78, the control winding of the push-pull magnetic amplifier being responsive to the error signal which in the embodiment shown is applied to the polarized relay 78. The operating coils 91 and 93 of the relays 88 and 90, respectively, would be disposed in the output circuit of the push-pull magnetic amplifier in a manner known to those skilled in the art. Of course, if a push-pull magnetic amplifier is substituted for the polarized relay 78, the current limiting resistors 112 and 116 and the arc suppression components 100, 102, 104 and 106 would be omitted. It is also to be understood that a polarized electronic sensing device could be substituted by one skilled in the art for the polarized relay 78.

The apparatus embodying the teachings of this invention has several advantages. For instance, since the apparatus illustrated in Figs. 1, 3 and 4 utilizes a null system, a small error signal is produced. Since a small error signal is available, a sensitive polarized relay 78 can be utilized to respond to the small error signal. However, since an extremely sensitive polarized relay can be utilized in the control apparatus, the control apparatus has a high gain. In addition, by utilizing a null system having a polarized relay incorporated therein, the size of the remaining components is kept to a minimum, thus giving a relatively high speed of response for the control apparatus. Further, a null system produces good accuracy.

Since certain changes may be made in the above apparatus and circuits and different embodiments of the invention may be made without departing from the scope thereof, it is intended that all matter contained in the above description and shown in the accompanying drawings shall be interpreted as illustrative and not in a limiting sense.

I claim as my invention:

1. In control apparatus for increasing or decreasing a given quantity at a predetermined constant rate, the combination comprising, a rheostat having an input and an output, the input of the rheostat being connected to a source of substantially constant voltage, a reversible motor mechanically connected to the rheostat, circuit means connected to the reversible motor for controlling the operation of the reversible motor so as to produce a reference voltage at the output of the rheostat that varies at a predetermined constant rate, other circuit means for producing a variable voltage proportional to said given quantity, further circuit means interconnected with the rheostat and with said other circuit means for producing an error signal proportional to the difference between said reference voltage and said variable voltage, and relaying means responsive to the error signal for controlling the magnitude of said given quantity to thereby effect, depending upon the direction of rotation of the reversible motor, an increase or a decrease in said given quantity at a predetermined constant rate.

2. In control apparatus for increasing or decreasing a given quantity at a predetermined constant rate, the combination comprising, a rheostat having an input and an output, the input of the rheostat being connected to a source of substantially constant direct-current voltage, a reversible motor mechanically connected to the rheostat, circuit means connected to the reversible motor for controlling the operation of the reversible motor so as to produce a reference voltage at the output of the rheostat that varies at a predetermined constant rate, said circuit means including a manual switch for controlling the direction of rotation of the reversible motor, other circuit means for producing a variable direct-current voltage proportional to said given quantity, further circuit means interconnected with the output of the rheostat and with said other circuit means for producing an error signal proportional to the difference between said reference voltage and said variable direct-current voltage, and relaying means responsive to the error signal for controlling the magnitude of said given quantity to thereby effect, depending upon the direction of rotation of the reversible motor, either an increase or a decrease in said given quantity at a predetermined constant rate.

3. In control apparatus for increasing or decreasing a given quantity at a predetermined constant rate, the combination comprising, a rheostat having an input and an output, the input of the rheostat being connected to a source of substantially constant direct-current voltage, a reversible motor mechanically connected to the rheostat, circuit means connected to the reversible motor for controlling the operation of the reversible motor so as to produce a reference voltage at the output of the rheostat that varies at a predetermined constant rate, said circuit means including a manual switch for controlling the direction of rotation of the reversible motor, other circuit means for producing a variable direct-current voltage proportional to said given quantity, further circuit means interconnected with the output of the rheostat and with said other circuit means for producing an error signal proportional to the difference between said reference voltage and said variable direct-current voltage, a polarized relay responsive to the error signal, and two other relays interconnected with the polarized relay and responsive to its operation to thereby control the magnitude of said given quantity to thus effect, depending upon the direction of rotation of the reversible motor, either an increase or a decrease in said given quantity at a predetermined constant rate.

4. In control apparatus for increasing or decreasing at a predetermined constant rate the load on a drive motor mechanically connected to a propeller the pitch of which can be varied, the combination comprising, a prop-pitch motor for actuating the propeller to change its pitch, means for producing a reference signal that varies at a predetermined constant rate, means electrically connected to the drive motor for producing a variable signal proportional to the load on the drive motor, circuit means interconnected with the first two means for producing an error signal proportional to the difference between said reference signal and said variable signal, and relaying means responsive to the error signal for effecting the actuation of the prop-pitch motor to change the pitch of said propeller to thereby effect, depending upon whether said reference signal is increasing or decreasing at a predetermined constant rate, either an increase or a decrease in the load on the drive motor at a predetermined constant rate.

5. In control apparatus for increasing or decreasing at a predetermined constant rate the load on a drive motor mechanically connected to a propeller the pitch of which can be varied, the combination comprising, a prop-pitch motor for actuating the propeller to change its pitch, a rheostat having an input and an output, the input of the rheostat being connected to a source of substantially constant direct-current voltage, a reversible motor mechanically connected to the rheostat, circuit means connected to said reversible motor for controlling the operation of said reversible motor so as to produce a direct-current reference voltage at the output of the rheostat that varies at a predetermined constant rate, a current transformer responsive to the load on said drive motor, other circuit means connected to the current transformer for producing a variable direct-current voltage proportional to the load on said drive motor, further circuit means interconnected with the output of the rheostat and with said other circuit means for producing an error signal proportional to the difference between said reference voltage and said variable direct-current voltage, and relaying means responsive to the error signal for effecting the actuation of the prop-pitch motor to change the pitch of said propeller to thereby effect, depending upon the direction of rotation of said reversible motor, either an increase or a decrease in the load on said drive motor at a predetermined constant rate.

6. In control apparatus for increasing or decreasing at a predetermined constant rate the load on a drive motor mechanically connected to a propeller the pitch of which can be varied, the combination comprising, a prop-pitch motor for actuating the propeller to change its pitch, a rheostat having an input and an output, the input of the rheostat being connected to a source of substantially constant direct-current voltage, a reversible motor mechanically connected to the rheostat, circuit means connected to said reversible motor for controlling the operation of said reversible motor so as to produce a reference voltage at the output of the rheostat that varies at a predetermined constant rate, said circuit means including a manual switch for controlling the direction of rotation of said reversible motor, a current transformer responsive to the load on said drive motor, other circuit means connected to the current transformer for producing a variable direct-current voltage proportional to the load on said drive motor, further circuit means interconnected with the output of the rheostat and with said other circuit means for producing an error signal proportional to the difference between said reference voltage and said variable direct-current voltage, and relaying means responsive to the error signal for effecting the actuation of the prop-pitch motor to change the pitch of said propeller to thereby effect, depending upon the direction of rotation of said reversible motor, either an increase or a decrease in the load on said drive motor at a predetermined constant rate.

7. In control apparatus for increasing or decreasing at a predetermined constant rate the load on a drive motor mechanically connected to a propeller the pitch of which can be varied, the combination comprising, a prop-pitch motor for actuating the propeller to change its pitch, a rheostat having an input and an output, the input of the rheostat being connected to a source of substantially constant direct-current voltage, a reversible motor mechanically connected to the rheostat, circuit means connected to said reversible motor for controlling the operation of said reversible motor so as to produce a reference voltage at the output of the rheostat that varies at a predetermined constant rate, said circuit means including a manual switch for controlling the direction of rotation of said reversible motor, a current transformer responsive to the load on said drive motor, other circuit means connected to the current transformer for producing a variable direct-current voltage proportional to the load on said drive motor, further circuit means interconnected with the output of the rheostat and with said other circuit means for producing an error signal proportional to the difference between said reference voltage and said variable direct-current voltage, a polarized relay responsive to the error signal, and two other relays interconnected with the polarized relay and responsive to its operation to effect the actuation of the prop-pitch motor to change the pitch of said propeller to thus effect, depending upon the direction of rotation of said reversible motor, either an increase or a decrease in the load on said drive motor at a predetermined constant rate.

8. In control apparatus for increasing or decreasing the speed of a main motor, having a field winding, at a predetermined constant rate, the combination comprising, circuit means for producing a reference signal that varies at a predetermined constant rate, a tachometer mechanically connected to said main motor for producing at the output of the tachometer a variable signal proportional to the speed of said main motor, other circuit means, interconnected with the circuit means for producing a reference signal and with the output of the tachometer, for producing an error signal proportional to the difference between said reference signal and said variable signal, a reversible motor for varying the voltage across the field winding of said main motor, and relay means responsive to the error signal for controlling the operation of said reversible motor to thereby vary the speed of said main motor and thus effect, depending upon whether said reference signal is increasing or decreasing at a predetermined constant rate, either an increase or a decrease in the speed of the main motor at a predetermined constant rate.

9. In control apparatus for increasing or decreasing the speed of a main motor, having a field winding, at a predetermined constant rate, the combination comprising, a rheostat having an input and an output, the input of the rheostat being connected to a source of substantially constant voltage, a rheostat motor mechanically connected to the rheostat, circuit means connected to said rheostat motor for controlling the operation of said rheostat motor so as to produce a reference voltage at the output of the rheostat that varies at a predetermined constant rate, a tachometer mechanically connected to said main motor for producing at the output of the tachometer a variable voltage proportional to the speed of said main motor, other circuit means, interconnected with the output of the rheostat and with the output of the tachometer, for producing an error signal proportional to the difference between said reference voltage and said variable voltage, a reversible motor for varying the voltage across the field winding of said main motor, and relaying means responsive to the error signal for controlling the operation of said reversible motor to thereby vary the speed of said main motor and thus effect, depending upon whether said reference voltage is increasing or decreasing at a predetermined constant rate, either an increase or a decrease in the speed of the main motor at a predetermined constant rate.

10. In control apparatus for increasing or decreasing the speed of a main motor, having a field winding, at a predetermined constant rate, the combination comprising, a rheostat having an input and an output, the input of the rheostat being connected to a source of substantially constant direct-current voltage, a reversible motor mechanically connected to the rheostat, circuit means connected to said reversible motor for controlling the operation of said reversible motor so as to produce a reference voltage at the output of the rheostat that varies at a predetermined constant rate, said circuit means including a manual switch for controlling the direction of rotation of said reversible motor, a tachometer mechanically connected to said main motor for producing at the output of the tachometer a variable voltage proportional to the speed of said main motor, other circuit means connected to the output of the tachometer for producing a variable direct-current voltage proportional to the speed of said main motor, further circuit means, interconnected with the output of the rheostat and with said other circuit means, for producing an error signal proportional to the difference between said reference voltage and said variable direct-current voltage, another reversible motor for varying the voltage across the field winding of said main motor, and relaying means responsive to the error signal for controlling the operation of said another reversible motor to thereby vary the speed of said main motor and thus effect, depending upon the direction of rotation of said reversible motor, either an increase or a decrease in the speed of said main motor at a predetermined constant rate.

11. In control apparatus for increasing or decreasing the speed of a main motor, having a field winding, at a predetermined constant rate, the combination comprising, a rheostat having an input and an output, the input of the rheostat being connected to a source of substantially constant direct-current voltage, a reversible motor mechanically connected to the rheostat, circuit means connected to said reversible motor for controlling the operation of said reversible motor so as to produce a reference voltage at the output of the rheostat that varies at a predetermined constant rate, said circuit means including a manual switch for controlling the direction of rotation of said reversible motor, a tachometer mechanically connected to said main motor for producing at the output of the tachometer a variable voltage proportional to the speed of said main motor, other circuit means connected to the output of the tachometer for producing a variable direct-current voltage proportional to the speed of said main motor, further circuit means, interconnected with the output of the rheostat and with said other circuit means, for producing an error signal proportional to the difference between said reference voltage and said variable direct-current voltage, another reversible motor for varying the voltage across the field winding of said main motor, a polarized relay responsive to said error signal, and two other relays interconnected with the polarized relay and with said another reversible motor for controlling the operation of said another reversible motor to thereby vary the speed of said main motor and thus effect, depending upon the direction of rotation of said reversible motor, either an increase or a decrease in the speed of said main motor at a predetermined constant rate.

12. In control apparatus for increasing or decreasing the output voltage of a generator, having a field winding, at a predetermined constant rate, the combination comprising, a rheostat having an input and an output, the input of the rheostat being connected to a source of substantially constant voltage, a rheostat motor mechanically connected to the rheostat, circuit means connected to said rheostat motor for controlling the operation of said rheostat motor so as to produce a reference voltage at the output of the rheostat that varies at a predetermined constant rate, other circuit means, interconnected with the output of the rheostat and with the output of the generator, for producing an error signal proportional to the difference between said reference voltage and a measure of the output voltage of the generator, a reversible motor for varying the voltage across the field winding of the generator, and relaying means responsive to the error signal for controlling the operation of said reversible motor to thereby vary the output voltage of the generator and thus effect, depending upon whether said reference voltage is increasing or decreasing at a predetermined constant rate, either an increase or a decrease in the output voltage of the generator at a predetermined constant rate.

13. In control apparatus for increasing or decreasing the output voltage of a generator, having a field winding, at a predetermined constant rate, the combination comprising, a rheostat having an input and an output, the input of the rheostat being connected to a source of substantially constant direct-current voltage, a reversible motor mechanically connected to the rheostat, circuit means connected to said reversible motor for controlling the operation of said reversible motor so as to produce a reference voltage at the output of the rheostat that varies at a predetermined constant rate, said circuit means including a manual switch for controlling the direction of rotation of said reversible motor, other circuit means connected to the output of the generator for producing at its output a variable direct-current voltage proportional to the output voltage of the generator, further circuit means, interconnected with the output of the rheostat and with the output of said other circuit means, for producing an error signal proportional to the difference between said reference voltage and said variable direct-current voltage, another reversible motor for varying the voltage across the field winding of the generator, and relaying means responsive to the error signal for controlling the operation of said another reversible motor to thereby vary the output voltage of the generator and thus effect, depending upon the direction of rotation of said reversible motor, either an increase or a decrease in the output voltage of the generator at a predetermined constant rate.

14. In control apparatus for increasing or decreasing the output voltage of a generator, having a field winding, at a predetermined constant rate, the combination comprising, a rheostat having an input and an output, the input of the rheostat being connected to a source of substantially constant direct-current voltage, a reversible motor mechanically connected to the rheostat, circuit means connected to said reversible motor for controlling the operation of said reversible motor so as to produce a reference voltage at the output of the rheostat that varies at a predetermined constant rate, said circuit means including a manual switch for controlling the direction of rotation of said reversible motor, other circuit means connected to the output of the generator for producing at its output a variable direct-current voltage proportional to the output voltage of the generator, further circuit means, interconnected with the output of the rheostat and with the output of said other circuit means for producing an error signal proportional to the difference between said reference voltage and said variable direct-current voltage, another reversible motor for varying the voltage across the field winding of the generator, a polarized relay responsive to said error signal, and two other relays interconnected with the polarized relay and with said another reversible motor for controlling the operation of said another reversible motor to thereby vary the output voltage of the generator and thus effect, depending upon the direction of rotation of said reversible motor, either an increase or a decrease in the output voltage of the generator at a predetermined constant rate.

15. In control apparatus for varying a given quantity at a predetermined constant rate, the combination comprising, a rheostat having an input and an output, the input of the rheostat being connected to a source of substantially constant voltage, control means for actuating the rheostat so as to produce a reference voltage at the output of the rheostat that varies at a predetermined constant rate, circuit means for producing a variable voltage proportional to said given quantity, other circuit means interconnected with the circuit means for producing a variable voltage proportional to said given quantity and with the rheostat for producing an error signal proportional to the difference between said reference voltage and said variable voltage, and relaying means responsive to the error signal for controlling the magnitude of the said given quantity to thereby effect a change in the said given quantity at a predetermined constant rate.

16. In control apparatus for varying the output voltage of a generator having a field winding, at a predetermined constant rate, the combination comprising, a rheostat having an input and an output, the input of the rheostat being connected to a source of substantially constant voltage, control means for actuating the rheostat so as to produce a reference voltage at the output of the rheostat that varies at a predetermined constant rate, circuit means, interconnected with the output of the rheostat and with the output of the generator, for producing an error signal proportional to the difference between said reference voltage and a measure of the output voltage of the generator, and control means responsive to the error signal for controlling the magnitude of the current flow through the field winding of the generator, to thereby vary the output voltage of the generator at a predetermined constant rate.

References Cited in the file of this patent

UNITED STATES PATENTS

| | | |
|---|---|---|
| 1,848,873 | Eames | Mar. 8, 1932 |
| 2,322,303 | Martin | June 22, 1943 |
| 2,612,956 | Banning | Oct. 7, 1952 |